A. F. McBETH.
CARPET STRETCHER.
APPLICATION FILED SEPT. 9, 1908.
965,118.
Patented July 19, 1910.
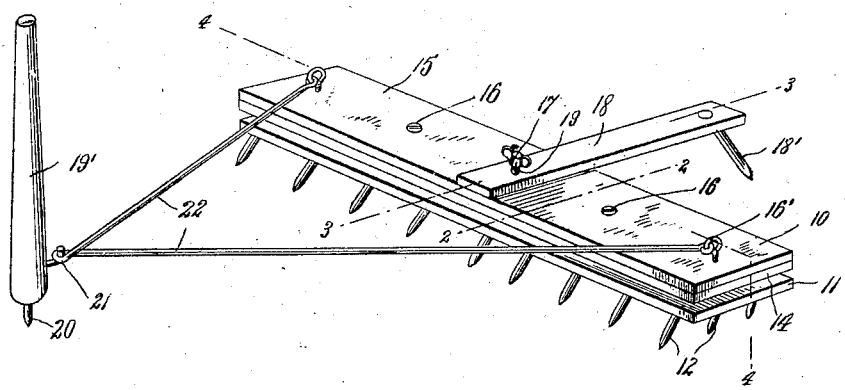
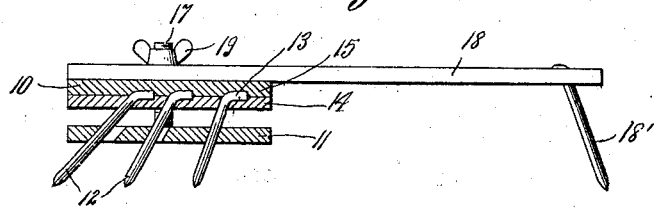
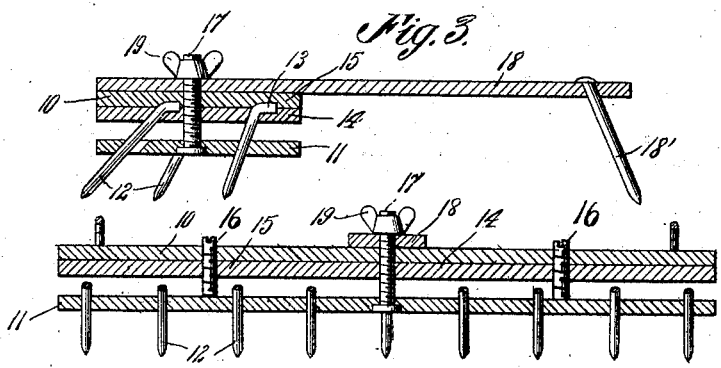
Inventor
Andrew F. McBeth,

UNITED STATES PATENT OFFICE.

ANDREW F. McBETH, OF WAITSBURG, WASHINGTON.

CARPET-STRETCHER.

965,118.  Specification of Letters Patent.   Patented July 19, 1910.

Application filed September 9, 1908. Serial No. 452,296.

*To all whom it may concern:*

Be it known that I, ANDREW F. McBETH, a citizen of the United States, residing at Waitsburg, in the county of Wallawalla, State of Washington, have invented certain new and useful Improvements in Carpet-Stretchers; and I do hereby declare the following to be a full, clear, and exact description of the invention, such as will enable others skilled in the art to which it appertains to make and use the same.

This invention relates to carpet stretchers.

One object of the invention is to provide a novel head block for carpet stretchers.

A second object of the invention is to improve the general construction of devices of this character.

With the above and other objects in view the invention consists in general of certain novel details of construction and arrangements of parts hereinafter fully described, illustrated in the accompanying drawings, and specifically set forth in the claims.

In the accompanying drawings, like characters of reference indicate like parts in the several views, and:—Figure 1 is a perspective view of a carpet stretcher constructed in accordance with this invention. Fig. 2 is a section on the line 2—2 of Fig. 1. Fig. 3 is a section on the line 3—3 of Fig. 1. Fig. 4 is a section on the line 4—4 of Fig. 1.

This carpet stretcher is provided with a head block 10 consisting of an upper plate 15 and a lower plate 14, the two together forming the block. Held in suitable recesses formed in the adjoining faces of the upper and lower plates are the heads 13 of pins 12. The shanks of these pins extend through suitable holes formed in the lower plate 14 and are so disposed that they lie at varying angles to the head block. Centrally disposed on the head block and extending rearwardly therefrom is a bar 18 provided at its rear end with a pin 18' which slants in the opposite direction to the pins carried by the head block. Extending through a suitable opening in the head block and the bar 18 is a screw 17 having a head upon its lower end and being provided on its upper end with a wing nut 19.

At 11 is indicated an adjusting plate which is slidably mounted on the pins 12 and through which passes the screw 17, the head of the screw fitting in a suitable recess on the under side of the adjusting plate. It will now be apparent that by rotating the wing nut 19 in one direction the plate 11 will be raised while if the wing nut be rotated in the other direction the plate will be allowed to drop. In order to hold the plate depressed upon release by the proper movement of the wing nut there are provided certain screws 16 which extend through threaded openings in the head block plates and have their lower ends bearing against the upper surface of the adjusting plate 11. By means of these screws the adjusting plate 11 may be prevented from rising while if it is desired to permit the same to rise the screws 16 are unscrewed and the wing nut 19 rotated to lift the plate 11. This plate 11, as thus constructed, prevents too great penetration of the pins 12.

In order to provide proper means for drawing the head block along to stretch the carpet the head block has at each end an upstanding eye 16' whereto are fastened the ends of a flexible strand such as a rope or wire 22. At 19' is a lever provided on its lower end with a spike point 20 and having projecting from one side a hook 21. This hook 21 engages in the bight of the strand 22 and by placing the spike 20 in such position that the handle of the lever 19' is slanted toward the head block and then forcing this handle outward away from the head block the block is drawn along. If, when this is done, the operator places his knee upon the bar 18 the spike 18' will be forced into the flooring to a sufficient degree to retain the carpet in position and the operator may then proceed to tack the edge thereof in the usual manner.

There has thus been provided a simple and efficient device of the kind described and for the purpose specified.

Having thus described the invention, what is claimed as new, is:—

1. A carpet stretcher comprising a head block, an adjusting plate, carpet engaging pins connected with the head block and extending through the adjusting plate, and means for adjusting said adjusting plate with respect to the head block.

2. A carpet stretcher comprising a head block having an upper plate and a lower plate, the latter provided with perforations, said upper and lower plates having opposed recesses adjacent to said perforations, carpet engaging pins extending through the lower plate and having their upper ends bent to be held in said recesses, an adjusting plate provided with perforations through which said pins pass, means to adjust said adjusting plate with relation to the head block, stretching means attached to said upper plate, and retaining means attached to said upper plate.

In testimony whereof, I affix my signature, in presence of two witnesses.

ANDREW F. McBETH.

Witnesses:
M. C. McGrew,
L. O. Crowder.